United States Patent [19]

Perego

[11] 4,345,777
[45] Aug. 24, 1982

[54] BABYS' PUSHCHAIRS, OF TYPE COLLAPSING WIDTHAWAYS AND EASY TO CARRY BY HAND LIKE AN UMBRELLA, PLUS RELATIVE IMPROVED PUSHCHAIR

[76] Inventor: Giuseppe Perego, Via De Gasperi, 20043 Arcore (Milano), Italy

[21] Appl. No.: 123,444

[22] Filed: Feb. 21, 1980

[30] Foreign Application Priority Data

Oct. 10, 1979 [IT] Italy ............................. 26390 A/79

[51] Int. Cl.³ .............................................. B62B 7/08
[52] U.S. Cl. ................................... 280/647; 280/658; 296/1 B; 297/45
[58] Field of Search ............... 280/638, 639, 647, 650, 280/649, 657, 658, 42, 47.37 R; 296/1 B; 297/42–45; 248/436

[56] References Cited

U.S. PATENT DOCUMENTS

| 3,142,351 | 7/1964 | Green ................................ 297/44 X |
| 4,077,641 | 3/1978 | Perego .............................. 280/650 X |
| 4,232,897 | 11/1980 | Maclaren ........................ 280/650 X |

FOREIGN PATENT DOCUMENTS

| 798194 | 11/1968 | Canada ................................ 280/647 |
| 2544351 | 4/1976 | Fed. Rep. of Germany ...... 280/650 |
| 971035 | 6/1950 | France ................................. 280/647 |
| 292620 | 8/1953 | Switzerland ........................ 280/647 |
| 632735 | 12/1949 | United Kingdom ............. 280/36 R |

*Primary Examiner*—Joseph F. Peters, Jr.
*Assistant Examiner*—Donald W. Underwood
*Attorney, Agent, or Firm*—McGlew and Tuttle

[57] ABSTRACT

An improved baby carriage is disclosed which includes side arm and handle structures that are interconnected by a folding linkage. The folding linkage can be activated to collapse the carriage width by moving the side structures together through the linkage. The carriage can thus be carried like an umbrella. A front cross arm is provided which is pivotally connected to one side arm structure and connected through a link to an opposite side structure. The link permits one end of the cross arm to swing out away from the side structure to which it is connected to permit widthwise collapsing of the carriage. The carriage also includes adjustable handles which have adjustments for varying the height of the handles above the ground and a pair of arc segments which are connected to a seat back of the carriage which are adjustable to regulate the inclination of the seat back.

15 Claims, 4 Drawing Figures

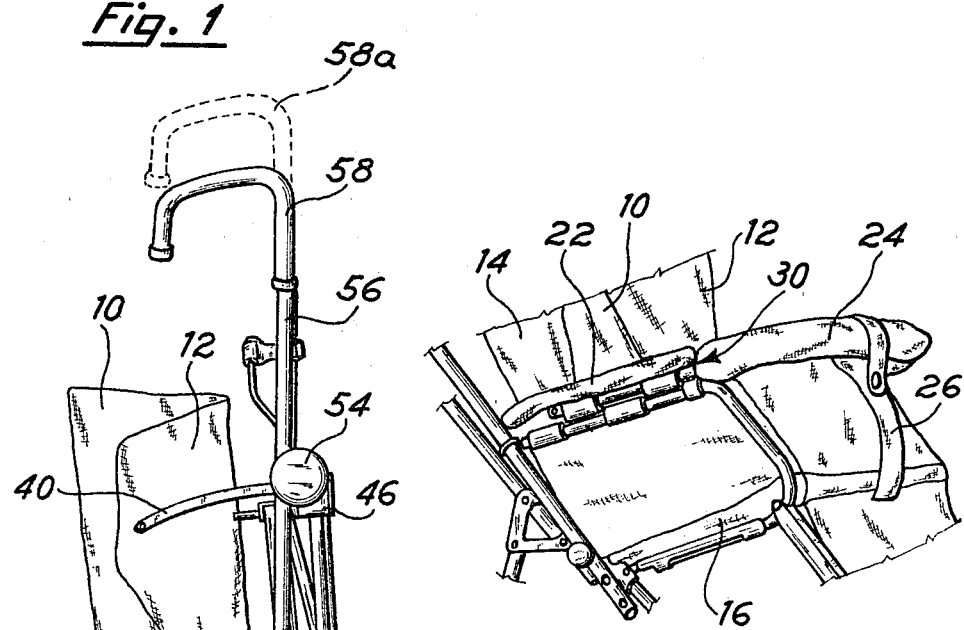
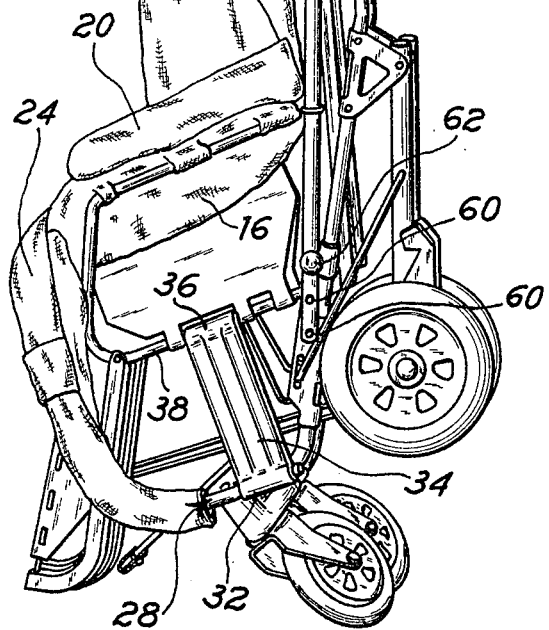

BABYS' PUSHCHAIRS, OF TYPE COLLAPSING WIDTHAWAYS AND EASY TO CARRY BY HAND LIKE AN UMBRELLA, PLUS RELATIVE IMPROVED PUSHCHAIR

FIELD AND BACKGROUND OF THE INVENTION

This invention refers to an improvement in perambulators of the folding type and, more especially to those that are collapsible in width, so that the assembly of wheels, seat structure, back and foot rest, as well as the handles and rods connected thereto, may move together resulting in the perambulator being easy to lift and to carry on the forearm, just like an umbrella.

These folding baby carriages are very widespread and possess considerable advantages. Since they can be folded and carried like an umbrella on public transport vehicles, they are advantageous both by virtue of their conformance with regulations and by not disturbing passengers who are often closely crowded together. Some of these carriages have an operating lever through which it is easy to collapse the carriages, widthwise.

Other carriages which are not collapsing in width, are complete with accessories for improving efficiency and safety in wheeling the baby. Particularly, such carriages are provided with a "front arm" or cross member which joins the two side arms of the carriage in the cross direction, and which is often joined to a ribbonlike guard connecting the middle of the front arm to the middle of the underlying seat. This addition to the carriage prevents the baby, sitting on the seat, from moving forward and perhaps falling as a result of any inevitable jerking of the actual carriage and movements due to the well known liveliness of babies themselves.

Furthermore, such carriages are used by persons, generally the baby's parents, whose height can differ, and hence it would be desirable for these carriages to be provided with handles or grips fastened to rods of variable lengths, in order to adapt the height of these handles from the ground to the height of the user.

Other important carriage characteristics include provision for varying the inclination of the back of the carriage seat to adapt the latter to the position most suited to the age, character and state of wakefulness or sleepiness of the baby.

SUMMARY OF THE INVENTION

The improvement in accordance with the invention eliminates the difficulties arising from an incomplete observance of the aforementioned plus other structural and functional characteristics of already known types of carriages and, more especially with regard to safety in wheeling the baby.

According to an essential characteristic of the improvement, the improved carriage, in addition to possessing a well known structure consisting of several linkages to permit widthwise collapsing of the carriage to allow its being carried like an umbrella, also has a front arm pivoted at one of its ends to the front end of one of the side arms and, at its other end, likewise pivoted, to a lever-like component, whose lower end is linked to the base of the opposing side structure of the seat, so that the crossways collapsing of the carriage, which causes the two arms to approach each other, as well as the folding up of the seat itself about its median vertical plane, is supported by an oscillatory movement of the front arm structure (which is preferably padded) about a point coinciding with the front end of the front arm, and by the rotation of the lever-like component about an axis essentially coinciding with the underside of the seat, so as to permit the front arm to assume an oblique condition compatible with the collapsing of the seat.

The connecting and pivoting points of the two ends of the front arm are preferably connected by means of telescoping tubular components incorporated into the structure bearing the side arm on one side and the lever-like component on the other side, so as to be able to support the baby's movements, as well as to adapt the space around the seat back, side arms and front arm to the size and bodily growth of the baby himself or herself.

According to another advantageous characteristic of the improvement, the rods bearing the carriage handles are connectd to the side structural components of the carriage through means which permit fixing at the rods at different heights along the side structures, with the side structure supporting the seat back along its side and connecting it to the underlying linkage structure carrying the carriage wheels.

Another object of the invention is to provide a folding baby carriage or perambulator which includes a rigid cross member or arm and which, despite the presence of the cross member or arm, can be collapsed in its width.

Another object of the invention is to provide such a perambulator which is simple in design, rugged in construction and economical to manufacture.

For an understanding of the principles of the invention, reference is made to the following description of typical embodiments thereof as illustrated in the accompanying drawings.

FIG. 1 is a perspective view, with some simplifications of a structural nature, of the improved carriage when completely folded and reduced to its minimum overall dimensions to enable its easy carrying like an umbrella;

FIG. 2 is a partial view consisting of the seat when "laid out flat" for wheeling the baby, and viewed from the side opposite to that in the following figure;

DESCRIPTION OF THE PREFERRED EMBODIMENT

Figure 3:
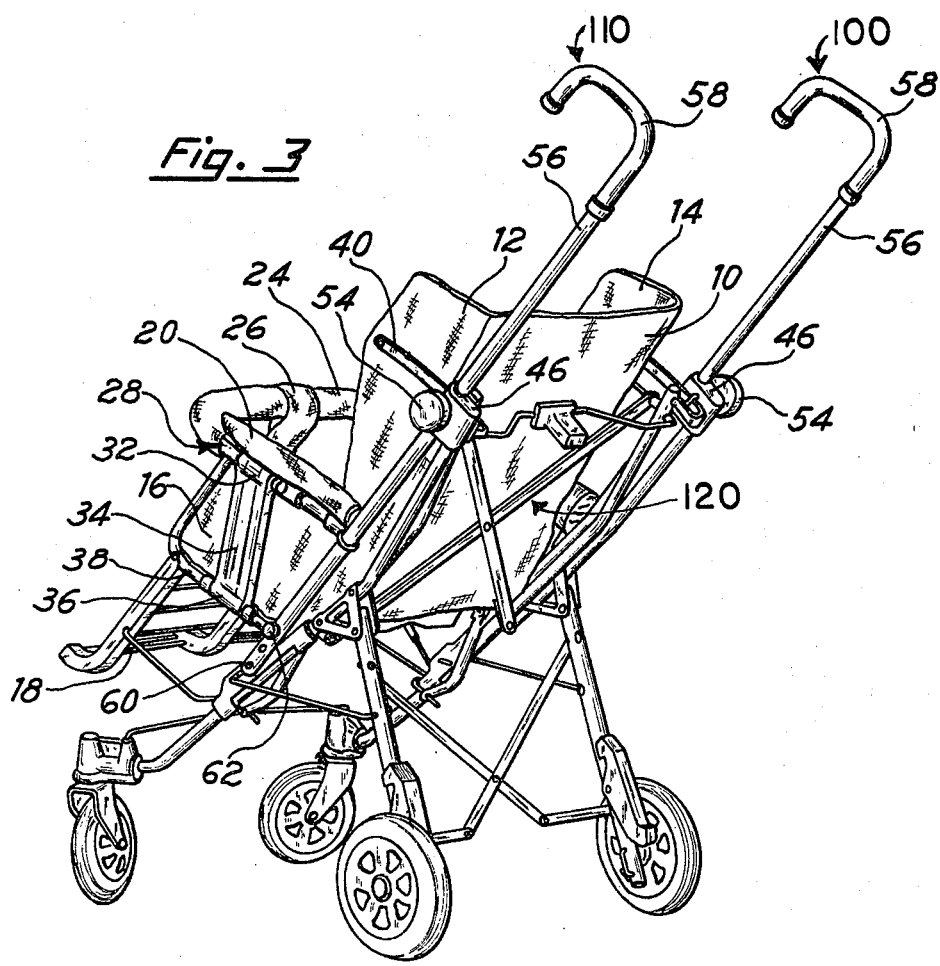
FIG. 3 is a rear perspective view in which the carriage is arranged for wheeling a baby.

Turning to the drawings, in particular, the invention embodied therein in FIGS. 1-3 comprises a perambulator or a baby carriage which is collapsible in its width. The carriage is shown in its expanded configuration in FIGS. 3 and includes a right-hand side handle and arm structure 100 and a left-hand side arm and handle structure 110. These side structures or frames are interconnected by a folding linkage generally designated 120 which, as with the side frames 100 and 110 are known in the art. Such structure comprises various levers and links whose function is well known and hence they are not referred to in detail.

According to such known structure, the carriage consists of a back 10 joined to symmetrical supporting side members 12 and 14, a seat 16, a footrest 18 and side arms 20 and 22, these items being individually visible in FIGS. 3 and 2.

Carriages of this type, as is well known, do not have a front arm which would prevent the carriage from collapsing sideways. Generally they only have a belt to hold the baby against the seat back in some manner.

The improved carriage has, instead, a front arm 24 which is preferably padded, and also preferably joined to a front vertical safety guard 26 which passes between the baby's legs; that is, it includes accessory parts typical of rigid or semi-rigid carriages, or those which collapse in the longitudinal direction only.

This front arm 24 is pivoted (see FIG. 2) to the front end of side arm 22, and more precisely to the front end of a sleeve fitted in a telescoping fashion to the structural components supporting arm 22. More precisely a component member 30 telescopically receives one end of front arm 24. The opposite end of arm 24 is telescopically received in a component 28. The distance between arm 24 and seat back 10 thus as shown in FIG. 3 can be adjusted.

One of these components 28 in which is accommodated one end of the arm 24, is connected in a swivelling fashion at 32 to the end (which becomes the upper end when the carriage is unfolded for use) (FIG. 3) of a lever 34, preferably of flat configuration. The lever 34 has its temporary lower end 36 (FIG. 3) connected in a swivelling fashion to a side component 38 of the side structure bearing seat 16.

When the carriage is fully folded down from the condition in FIG. 3 to that in FIG. 1, side arms 20 and 22 approach each other, as do the side structure members bearing the seat. During this operation, lever 34 swings down towards the outside about the component 38 which acts as a fulcrum, until reaching the position indicated in FIG. 1, while front arm 24 pivoted at 28 and 30, assumes an oblique condition as represented in FIG. 1 and hence it does not oppose the crosswise collapsing of the carriage. In particular the approach of the side structures for seat 16 are not hindered by the cross member or front arm 24.

Of course, during the reverse operation, when preparing the carriage for use, that is, when passing from the condition in FIG. 1 to the condition in FIGS. 2 and 3, the lever 34 is raised again from its position in FIG. 1, to that of FIG. 3, while the front arm is lifted up to assume its substantially horizontal position between the front ends of arms 20 and 22, as can be seen in FIGS. 2 and 3.

Back 10 of the carriage can be inclined by any increments as required.

For this purpose, side members 12 and 14 of the back are joined to flat arc segments 40 (only one of which is visible in FIGS. 1 and 3, plus a greatly enlarged section view in FIG. 4, to which reference will be chiefly made hereinafter). This segment 40 is overlapped by hook or clamp 42 which is bent in two right angles; the largest straight section 44 passes through a shaped part 46 with threaded section 48 to engage a blind hole 50 in boss 52 of knob 54 located on the outer side of the carriage. The structure which is represented in detail in FIG. 4 is reproduced identically and symmetrically at both sides of the carriage.

Figure 4:
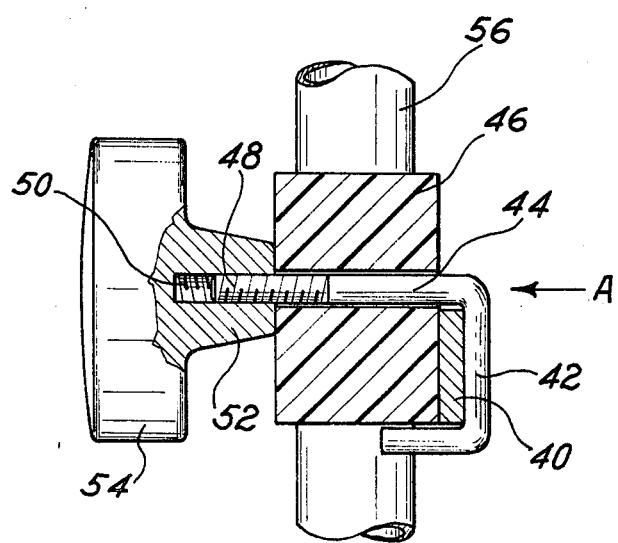
FIG. 4 is a partial side elevation and partial cross sectional view of the parts forming the adjustable means through which the seat back is clamped at different inclinations.

When knob 54 is fully tightened, the axial thrust of boss 52 of knob 54 against the adjacent face of shaped part 46, as well as against the adjacent face of handle are 56 carrying respective handle 58, causes hook 42 of threaded pin or member 44 to be thrusted in the direction indicated by arrow A in FIG. 4. As a result, segment 40 is locked against the outer face of part 46, thereby clamping the back of the pushchair at the desired inclination. Of course, by loosening the two knobs 54 it is possible to vary this inclination as desired within the angular adjustment range of arc segments 40.

According to another advantageous characteristic of the improvement, handles 58 can be adjusted to different heights above the ground, for example, from the position indicated in FIGS. 1 and 3, to the position indicated by 58a in FIG. 1. For this purpose, a series of holes 60, for example, three holes are provided at the lower end of each rod 56 (only one of these ends is visible in FIGS. 1 and 3). One of these holes is interconnected to a rear structural component of the pushchair. The lower end of the respective rod 56 can be engaged in the chosen hole by means of a threaded pin fastened to the rear structural component, that is connected to each side frame. A screw-in knob 62 serves to lock the lower end of the respective rod at the chosen height. The chosen hole of rod 56 is engaged over the pin and the rod is held by threaded knob 62.

While specific embodiments of the invention have been shown and described in detail to illustrate the application of the principles of the invention, it will be understood that the invention may be embodied otherwise without departing from such principles.

I claim:

1. In a folding perambulator having a pair of side frames each with a side arm, a folding linkage interconnecting the side frames which is foldable to allow the pair of side frames to approach each other in a widthwise collapsed state of the perambulator and unfoldable to allow separation of the side frames in an uncollapsed state of the perambulator, and a foldable seat and seat back connected between the side frames, the improvement comprising:

a rigid cross arm extending between the side arms with the perambulator in its uncollapsed state having one end pivotally connected to one side arm; and a lever member pivotally connected at one end thereof to an opposite end of said cross arm; said lever member pivotally connected at an opposite end thereof to the side frame carrying the other side arm at a location vertically spaced from the other side arm, so that said rigid cross arm can move from a substantially horizontal position with the perambulator uncollapsed into a substantially oblique position with the perambulator collapsed.

2. In a folding perambulator, the improvement according to claim 1, wherein said lever member is pivotally mounted at both its opposite ends on an axis substantially contained in a plane substantially containing the side frame carrying the other side arm.

3. In a folding perambulator, the improvement according to claim 2, wherein the side frame carrying the other side arm has a component extending substantially parallel to the other side arm and spaced vertically downwardly of the other side arm on the side frame by a distance substantially equal to a length of said lever member, said lever member pivotally mounted at its opposite end about said component so that, with the perambulator in its uncollapsed state, the first mentioned end of said lever member pivotally mounted to said rigid cross arm is substantially at the level of the other side arm, and whereby, with the perambulator being folded into its collapsed state, the first mentioned end of the lever member moves in an arc about said component which acts as a fulcrum for the movement of said lever member.

4. In a folding perambulator, the improvement according to claim 1, including a sleeve component member connected to the one side arm for telescopically receiving said one end of said rigid cross arm, and a component member connected to said one end of said lever member for telescopically receiving said other end of said rigid cross arm, whereby a spacing between said rigid cross arm and the seat back can be varied.

5. In a folding perambulator, the improvement according to claim 1, wherein said lever member is a substantially flat part in the plane contained by the axis of rotation of said lever member about its opposite end.

6. In a foldable perambulator, the improvement according to claim 1, including padding over said rigid cross arm between the ends thereof.

7. In a folding perambulator, the improvement according to claim 1, including a strap member connected between a central point on said rigid cross arm and a front central point of the foldable seat.

8. In a folding perambulator, the improvement according to claim 7, wherein said strap is flexible to permit movement of said rigid cross arm between its horizontal position and its oblique position.

9. In a folding perambulator, the improvement according to claim 1, wherein each side frame includes a handle member and adjustment means connected between each handle member and each side frame respectively for varying the distance between a handle portion of each handle member and the ground.

10. In a folding perambulator, the improvement according to claim 9, wherein each handle rod includes a plurality of spaced holes and each side frame includes a pin member extending through at least one hole of each handle member and engaged with each respective side frame.

11. In a folding perambulator, the improvement according to claim 10, including a threaded knob threaded onto each of said pin members for holding each handle member fixed with respect to each respective side frame.

12. In a folding perambulator, the improvement according to claim 1, including adjustment means connected between the side frames and the seat back for adjusting an inclination of the seat back with respect to the seat.

13. In a folding perambulator, the improvement according to claim 12, wherein said means for adjusting the inclination of the seat back comprises at least one curved flat segment connected to the seat back and a clamping mechanism connected to at least one side frame for receiving the curved segment for clamping the curved segment at a point along its length.

14. In a folding perambulator, the improvement according to claim 13, wherein said clamping mechanism comprises a shaped part connected to the at least one side frame, a clamping hook having a threaded leg and a hook end passing over said curved segment member, said threaded leg extending through said shaped part, and a threaded knob threadable onto a portion of said threaded leg extending through said shaped part to urge said curved segment against said shaped part.

15. In a folding perambulator, the improvement according to claim 14, wherein said threaded knob includes a threaded blind hole for receiving a threaded end of said threaded leg.

* * * * *